UNITED STATES PATENT OFFICE.

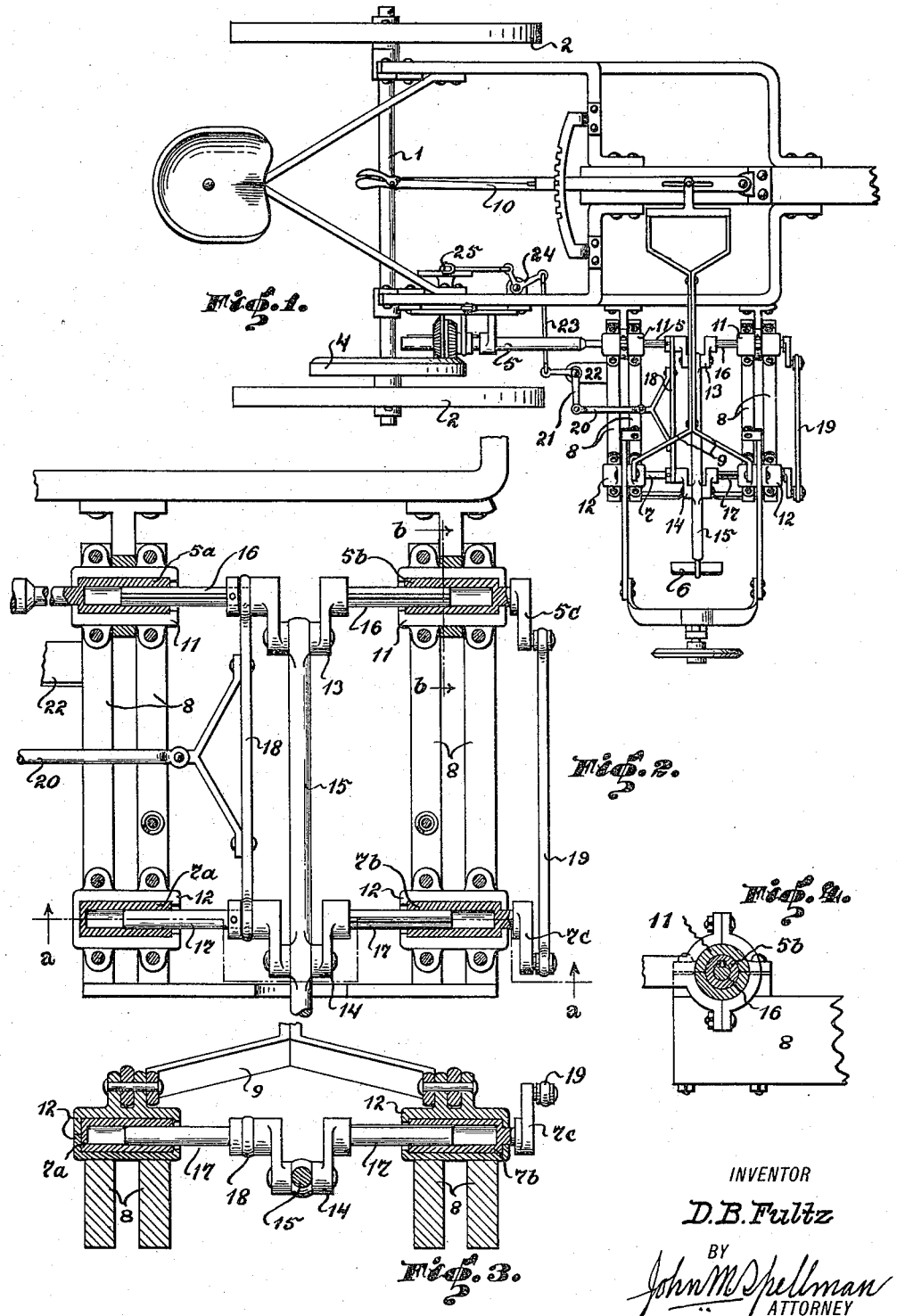

DECK B. FULTZ, OF BARRY, TEXAS.

ATTACHMENT FOR COTTON-CHOPPERS.

1,176,955.  Specification of Letters Patent.  Patented Mar. 28, 1916.

Application filed June 29, 1915. Serial No. 36,934.

*To all whom it may concern:*

Be it known that I, DECK B. FULTZ, a citizen of the United States, residing at Barry, in the county of Navarro and State of Texas, have invented certain new and useful Improvements in Attachments for Cotton-Choppers, of which the following is a specification.

My invention has relation to a cotton chopper of substantially the type or class described and illustrated in Patent #1,133,553 issued to me on March 30th, 1915, and in such connection it relates more particularly to the arrangement and construction of means whereby the chopping hoe while revolving in a supplemental swinging frame may be shifted, longitudinally of the machine, in said frame, to permit the operator of the machine to control the hoe, and to direct it selectively to plants which are not to be cut. In said Patent #1,133,553, the revolving hoe is supported in a swinging supplementary frame whereby it may be raised or lowered by the operator to compensate for inequalities in the ground and thus prevent the hoe cutting too far above or too close to the ground. A differential gear mechanism is also provided in said patent whereby the number of revolutions of the hoe in a given time may be varied and thus where a sparse number of plants appear a fewer number may be cut out than are cut in rows containing plants thickly set together.

In my present device or improvement I make provision whereby the operator may select which plant is to be cut or which plant is to be spared. Thus in a sparse row some plants may be strong and some may be small and immature. Again even if the hoe were revolving at its slowest speed it may happen that the plants are so widely separated that the hoe will take or cut out too many plants in the row.

In the carrying out of my invention, the hoe is arranged to revolve in its supplementary swinging frame and in addition thereto a means is provided whereby the hoe may be shifted longitudinally of the machine and thus may be brought to position where, upon revolving, it will not cut the plant which ordinarily would be in the path of the hoe.

The nature and scope of my invention will be more fully understood from the following description taken in connection with the accompanying drawings forming part hereof, in which,—

Figure 1, is a top or plan view of a cotton chopping machine embodying the main features of my invention. Fig. 2, is an enlarged plan view, partly sectioned, of the means for shifting the hoe longitudinally in the supplementary frame. Fig. 3, is a sectional view taken on the line $a, a$ of Fig. 2, and Fig. 4, is a cross-sectional view taken on line $b, b$ of Fig. 2.

Referring to the drawings, 1 represents the axle and 2, 2, the wheels of the machine. The axle 1 is fixed to said wheels and in revolving carries with it the gear plate 4, driving through the differential gears formed thereon, as described in my former patents, the crank shaft 5 which serves to revolve the hoe 6. The crank shaft 5 and an additional crank shaft 7 have bearings in a supplementary swinging frame 8, which may be raised or lowered upon the crank shaft 5 as a pivot or fulcrum. The means for raising and lowering the frame 8 consists essentially of straps 9 connecting the free end of the frame 8 above crank shaft 7 directly with a hand lever mechanism 10. So far as described the parts are substantially the same as shown in my former patent and the method of operation is the same.

In the present device the two crank shafts 5 and 7 operating the hoe 6 are arranged to shift longitudinally in frame 8. To permit of such shifting the ends of each shaft 5 or 7 are in the form of sleeves $5^a$, $5^b$, $7^a$ and $7^b$ arranged to turn in bearings 11 and 12 in the frame 8 but not to shift therein. The cranks 13 and 14 which operate the handle 15 are each carried by the shafts 16 or 17 which are splined in the sleeves or boxes $5^a$, $5^b$, $7^a$ and $7^b$. The shafts 16 and 17 are connected by a strap 18, arranged intermediate of the bearings and within the frame 8. The boxes or sleeves $5^b$ or $7^b$ are also connected to turn in unison, each box or sleeve having a crank arm $5^c$ or $7^c$ formed on the outer end of the respective sleeve and these two crank arms $5^c$, $7^c$ are connected by a link 19. The strap 18 connecting shafts 16 and 17 is connected to one end of a link 20, the other end of said link 20 being connected pivotally to one arm of a bell crank lever 21 pivotally supported in an extension 22 of the frame 8 and the other arm of bell crank lever 21 is connected by link 23 with one arm of a bell crank lever 24 pivotally supported in the main frame work of the machine. The lever 24 is arranged oppositely with respect to the lever 21. A hand lever 25 pivotally supported by the main frame serves as a convenient means for operating the lever 24 and through the intermediate mechanism is adapted to shift the two crank shafts 16 and 17 in either direction in the boxes 5ª, 5ᵇ, 7ª and 7ᵇ carried by the supplementary frame 8.

In the operation of the chopper, if for any reason it is desirable to vary the plane of rotation of the hoe 6 longitudinally with respect to the line of travel of the machine, and to thereby cause the hoe 6 in its operation to miss a plant or to cut out two adjacent plants, the crank shafts 16 and 17 are shifted in the boxes in the required direction, without, however, stopping the rotation of the hoe.

Having thus described the nature and objects of my invention what I claim as new and desire to secure by Letters Patent, is,—

1. In a cotton chopper, a hoe, two crank shafts adapted to revolve the hoe, a supplementary frame forming bearings for the crank shafts and a means for sliding said crank shafts in said frame to vary the plane of rotation of the hoe.

2. In a cotton chopper, a hoe, two crank shafts adapted to revolve the hoe, a supplementary frame forming bearings for the crank shaft, a strap connecting the crank shafts and a hand lever with intermediate mechanism adapted to slide the strap and crank shafts longitudinally in the frame to vary the plane of rotation of the hoe.

In testimony whereof I have signed my name to his specification.

DECK B. FULTZ.

Copies of this patent may be obtained for five cents each, by addressing the "Commissioner of Patents, Washington, D. C."